United States Patent [19]

Beyerlein et al.

[11] Patent Number: 4,482,644

[45] Date of Patent: Nov. 13, 1984

[54] OXYGEN-DEFICIENT, BARIUM-CONTAINING PEROVSKITES

[75] Inventors: Robert A. Beyerlein, Westfield; Allan J. Jacobson, Princeton; Kenneth R. Poeppelmeier, Flemington, all of N.J.

[73] Assignee: Exxon Research & Engineering Co., Florham Park, N.J.

[21] Appl. No.: 485,708

[22] Filed: Apr. 18, 1983

[51] Int. Cl.³ ............... B01J 23/02; B01J 23/10; B01J 23/18

[52] U.S. Cl. ............... 502/303; 502/302; 502/304; 502/328; 502/340; 502/341; 502/343; 502/525

[58] Field of Search ........... 502/302, 303, 304, 328, 502/340, 341, 343, 525; 423/593

[56] References Cited

U.S. PATENT DOCUMENTS

| | | |
|---|---|---|
| 3,374,281 | 3/1968 | Csicsery . |
| 3,435,089 | 3/1969 | Moore et al. . |
| 3,494,956 | 2/1970 | Greene et al. . |
| 3,494,972 | 2/1970 | Friedli . |
| 3,631,216 | 12/1971 | Lipsig . |
| 3,644,550 | 2/1972 | Beuther et al. . |
| 3,644,551 | 2/1972 | Ondrey et al. . |

(List continued on next page.)

FOREIGN PATENT DOCUMENTS

| | | |
|---|---|---|
| 932339 | 8/1973 | Canada . |
| 2030699 | 6/1969 | Fed. Rep. of Germany . |
| 2755900 | 12/1976 | Fed. Rep. of Germany . |
| 989069 | 5/1969 | Japan . |
| 74040701 | 9/1969 | Japan . |
| 74040702 | 9/1969 | Japan . |
| 49110604 | 3/1973 | Japan . |
| 53002407 | 6/1976 | Japan . |
| 53002424 | 6/1976 | Japan . |
| 7606829 | 6/1975 | Netherlands . |
| 1213715 | 11/1970 | United Kingdom . |
| 1259766 | 1/1972 | United Kingdom . |
| 1598809 | 6/1977 | United Kingdom . |
| 0442823 | 6/1975 | U.S.S.R. . |

OTHER PUBLICATIONS

Sakamoto, *J. Catal.*, 16, 407 (1970).
Seiyama et al., *J. Catal.*, 24, 76 (1972).
Goldwasser et al., *Acta Chemica Scand.*, B32, 286 (1978).
E. A. Mamedov, *Russ. Chem. Reviews*, 50, 291, (1981).
K. Poeppelmeier et al., U.S. Pat. Application No. 288,996 filed 7/31/81 due unofficially to issue on Jun. 17, 1983 as U.S. Pat. No. 4,388,294.
J. Huber et al., *J. Catal.*, 28, 489 (1973).
H. Swift et al., *J. Catal.*, 21, 212 (1971).
F. Massoth et al., *J. Catal.*, 21, 225 (1971).

*Primary Examiner*—W. J. Shine
*Attorney, Agent, or Firm*—Janet E. Hasak; Henry E. Naylor

[57] ABSTRACT

A class of oxygen-deficient, barium-containing compounds having a perovskite-type structure may be prepared which are of the formula:

$$Ba_2M_aM'_{2-a}O_{5+y}$$

if M is a trivalent cation, or $$Ba_3M_aM'_{3-a}O[7.5-(a/2)+y]$$

if M is a divalent cation, wherein M is Mg, Ca, Sr, Ba, Sc, Y, La, the lanthanides of atomic number 58 or greater, Ni, Fe, Cu, Al, Ga, In, Zn, Cd, Hg, Bi, Tl or a mixture thereof, M' is Sb or Bi, a is equal to or greater than 0 but less than or equal to 1, and if M is trivalent, y is equal to or greater than 0 but less than 1, and if M is divalent, y is equal to or greater than 0 but less than $(3+a)/2$.

Preferably, the compounds herein are of the formula:

$$Ba_2M_aM'_{2-a}O_{5+y}$$

where M is La or Sc, a is equal to or greater than 0 but less than or equal to 1 and y is equal to or greater than 0 but less than 1.

This class of compounds are readily reoxidized and therefore are useful in oxidative dehydrogenation reactions.

20 Claims, 2 Drawing Figures

U.S. PATENT DOCUMENTS

| | | |
|---|---|---|
| 3,730,957 | 5/1973 | Bozik et al. .................. 585/415 |
| 3,769,237 | 10/1973 | Ondrey et al. . |
| 3,769,361 | 6/1971 | Friedli . |
| 3,786,109 | 9/1968 | Jones . |
| 3,830,866 | 8/1974 | D'Alessandro et al. . |
| 3,879,486 | 4/1975 | Mitchell, Jr. . |
| 3,963,793 | 6/1976 | Weterings . |
| 4,007,231 | 2/1977 | Butter . |
| 4,036,902 | 7/1977 | Gregory . |
| 4,110,258 | 8/1978 | Lauder .............................. 502/306 |
| 4,143,087 | 3/1979 | Bamforth et al. . |
| 4,169,865 | 10/1979 | Bamforth et al. . |
| 4,229,320 | 1/1979 | Slaugh . |
| 4,247,726 | 1/1981 | Slaugh . |
| 4,247,727 | 1/1981 | Tremont et al. ................ 585/428 |
| 4,268,703 | 5/1981 | Williamson et al. . |
| 4,268,704 | 5/1981 | Tremont et al. . |
| 4,278,824 | 7/1981 | Tremont et al. . |
| 4,278,825 | 7/1981 | Tremont et al. ................ 585/428 |
| 4,278,826 | 7/1981 | Tremont et al. . |
| 4,293,723 | 7/1979 | Slaugh . |

OXYGEN-DEFICIENT, BARIUM-CONTAINING PEROVSKITES

BACKGROUND OF THE INVENTION

This invention is related to a class of novel oxygen-deficient, barium-containing compounds having a perovskite-type structure and to a process for the preparation thereof. Preferably, the compounds also contain bismuth.

DESCRIPTION OF RELATED DISCLOSURES

During a typical petroleum refining operation large quantities of low molecular weight paraffins and olefins are produced. Unlike paraffins which may be sold at relatively low cost for fuels, olefins have undesirable combustion properties which hamper their potential use as fuels. Thus, much research effort has been directed toward upgrading the olefins, either for use as fuel or as chemical intermediates in the chemicals industry. For those olefins containing three to four carbon atoms, much research effort has been directed toward reaction products such as dimers and aromatic products having greater potential value, with bismuth oxide representing a conventional oxidation catalyst particularly for producing dimers.

Oxidative conversions of unsaturated hydrocarbons have recently been conducted using various catalyst combinations. A recently published comprehensive review article on oxidative dehydrogenation of olefins is E. A. Mamedov, *Russ. Chem. Reviews*, 50, 291 (1981), which lists numerous references disclosing use of catalysts containing bismuth oxide in combination with other elements to convert olefins to dienes and aromatic products in the presence or absence of molecular oxygen.

U.S. Pat. No. 4,110,258 to Lauder discloses perovskites of the form $BaBO_3$ which may include Bi or mixtures of Bi and La on the B site but require 1 to 20% of the B site to be occupied by a Pt group metal for use as exhaust gas clean-up catalysts in the conversion of $NO_x$, CO and hydrocarbons to $N_2$, $CO_2$ and $H_2O$. U.S. Pat. No. 3,730,957 to Bozik et al. discloses use of bismuth-containing catalysts for use in oxidative dehydrodimerization.

SUMMARY OF THE INVENTION

There is provided herein a novel class of oxygen-deficient, barium-containing compounds having a perovskite-type structure of the formula:

$$Ba_2M_aM'_{2-a}O_{5+y}$$

if M is a trivalent cation, or $$Ba_3M_aM'_{3-a}O_{[7.5-(a/2)+y]}$$

if M is a divalent cation, wherein M is selected from the group consisting of Mg, Ca, Sr, Ba, Sc, Y, La, the lanthanides of atomic number 58 or greater, Ni, Fe, Cu, Al, Ga, In Zn, Cd, Hg, Bi, Tl and a mixture thereof, M' is selected from the group consisting of Sb or Bi, a is equal to or greater than 0 but less than or equal to 1, and if M is a trivalent cation, y is equal to or greater than 0 but less than 1, and if M is a divalent cation, y is equal to or greater than 0 but less than $(3+a)/2$. Preferably, M' is Bi and a is 0, or if a is greater than 0, M is Sc or La. Most preferably, the compounds herein are oxygen-deficient, barium- and bismuth-containing compounds having a perovskite-type structure of the formula:

$$Ba_2M_aBi_{2-a}O_{5+y}$$

where M is La or Sc, a is defined above and y is equal to or greater than 0 but less than 1. If a in the above formula is greater than 0 and M is La, y is preferably less than or equal to 0.1.

The above class of compounds may be prepared by heating the fully oxidized precursor compound (wherein in the above formulae y is about but no greater than 1 if M is trivalent and y is about but no greater than $(3+a)/2$ is M is divalent) in the presence of an effective amount of oxygen at a temperature of at least about 600° C., depending on the particular precursor compound and the amount of oxygen present, for a sufficient period of time to produce the oxygen-deficient compound (where y is less than 1 if M is trivalent and y is less than $(3+a)/2$ if M is divalent).

The class of oxygen-deficient compounds herein are readily reoxidized and therefore may be used in oxidative dehydrogenation reactions or in similar processes requiring solid oxidizing agents. In particular, the compounds herein (and their fully oxidized precursors) may be used as catalysts in selectively producing aromatic products or dimers fom acyclic olefins, preferably propylene or isobutylene, as described in U.S. Patent Application Ser. Nos. 485,706 and 485,707, respectively filed of even date with this application, both now abandoned with applicants K. Poeppelmeier and J. Longo, the disclosures of which applications are incorporated herein by reference.

DESCRIPTION OF THE PREFERRED EMBODIMENTS

Figure 1:
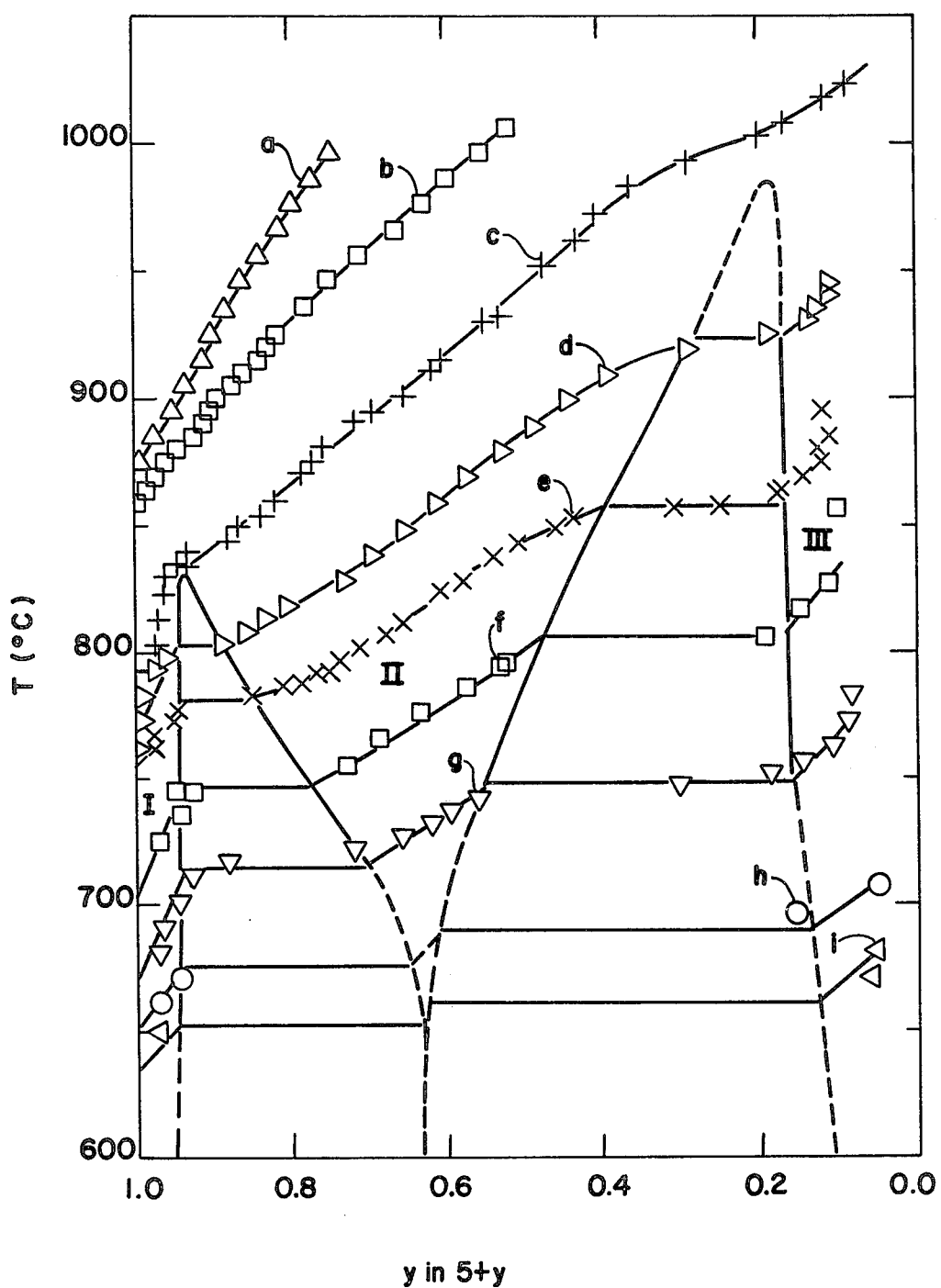
FIG. 1 represents a phase diagram for synthesis of $Ba_2Bi_2O_{5+y}$ which is a plot of the temperature used for the synthesis versus the extent of oxygen deficiency in $Ba_2Bi_2O_{5+y}$ (the value of y) for nine given partial pressures of oxygen.

The class of oxygen-deficient compounds herein have the perovskite-type structure as described in A. F. Wells, *Structural Inorganic Chemistry*, 4th ed., Ch. 4 (Clarendon Press, 1975).

The compounds herein have a composition of one of the formulae:

$$Ba_2M_aM'_{2-a}O_{5+y}$$

if M is trivalent, or $$Ba_3M_aM'_{3-a}O_{[7.5-(a/2)+y]}$$

if M is divalent, wherein M is selected from Mg, Ca, Sr, Ba, Sc, Y, La, the lanthanides of atomic number 58 or greater, Ni, Fe, Cu, Al, Ga, In, Zn, Cd, Hg, Bi or Tl, M' is either Sb or Bi, a is equal to or greater than 0 but less than or equal to 1, and, if M is a trivalent cation, y is equal to or greater than 0 but less than 1, and, if M is a divalent cation, y is equal to or greater than 0 but less than $(3+a)/2$. The precise value of y is the amount necessary to satisfy the valence of M'. The lanthanides of atomic number of at least 58 consist of Ce, Pr, Nd, Sm, Eu, Gd, Tb, Dy, Ho, Er, Tkm, Yb and Lu. Preferably, M' is Bi and a is 0 or M' is Bi, a is greater than 0, and M is La or Sc. Examples of suitable compounds for this purpose include $Ba_3MgBi_2O_{7+y}$, $Ba_3CaBi_2O_{7+y}$, $Ba_3SrBi_2O_{7+y}$, $Ba_3BaBi_2O_{7+y}$, $Ba_2ScBiO_{5+y}$, $Ba_2YBiO_{5+y}$, $Ba_2LaBiO_{5+y}$, $Ba_2La_{0.5}Bi_{1.5}O_{5+y}$, $Ba_2CeBiO_{5+y}$, $Ba_2PrBiO_{5+y}$, $Ba_2NdBiO_{5+y}$, $Ba_2DyBiO_{5+y}$, $Ba_2AlBiO_{5+y}$, $Ba_2GaKBiO_{5+y}$, $Ba_2InBiO_{5+y}$, $Ba_2TlBiO_{5+y}$, $Ba_{2l}BiBiO_{5+y}$, $Ba_3NiBI_2O_{7+y}$, $Ba_2FeBiO_{5+y}$, $Ba_3CuBi_2O_{7+y}$, $Ba_3ZnBi_2O_{7+y}$, $Ba_3CdBi_2O_{7+y}$, $Ba_3HgBi_2O_{7+y}$, and the like.

In the above formulae, the word "divalent" signifies that the metal M is contained in the oxide in an oxidation state of +2, and the word "trivalent" signifies that the metal M is contained in the oxide in an oxidation state of +3.

It is noted that the compositions of this invention having the above general formulae may comprise more than one phase having the overall composition described above. One preferred class of compounds herein are those of the formula:

$$Ba_2La_aBi_{2-a}O_{5+y}$$

where a is from 0 to 1 and y is equal to or greater than 0 but less than 1. These preferred compounds, many of which have been characterized by x-ray diffraction, generally comprise one phase. If the compounds of this preferred class do not contain lanthanum (i.e., a is 0), y preferably ranges from about 0 to about 0.6 and more preferably is about 0.6 or about 0 (i.e., ranges from 0 to 0.2). If the compound contains lanthanum (i.e., a is greater than 0), y preferably is less than or equal to 0.1, and more preferably y is 0 and a is 0.5.

The fully oxidized precursor compounds to be used as starting materials in preparing the novel compositions of this invention are of the formula:

$$Ba_2M_aM'_{2-a}O_{5+y}$$

if M is trivalent, or $$Ba_3M_aM'_{3-a}O_{[7.5-(a/2)+y]}$$

if M is divalent, wherein M, M', and a are defined above, y is about 1 but not greater than 1 if M is trivalent, and y is about (3+a)/2 but not greater than (3+a)/2 if M is divalent. These precursors may be prepared by any convenient means known to those skilled in the art. A typical procedure involves preparing a physical mixture by grinding stoichiometric amounts of barium carbonate or nitrate with salts or oxides of the other two metal components, heating the mixture to about 350°–450° C., preferably to about 400° C., cooling and regrinding the resultant mixture in air, and heating the ground, cooled mixture to about 700° to 1000° C. for about three to seventy hours, depending on other conditions, in a furnace. Product formation is monitored via X-ray diffraction measurements. The products have structures related to the perovskite structure with pseudo-cubic unit cells of about 4.3 Å, depending slightly on the ionic radii of M.

For the investigations and experiments herein disclosed for preparing the preferred class of bismuth-containing or bismuth- and lanthanum-containing precursors, a mixture may be formed containing barium nitrate and bismuth nitrate pentahydrate and, if a is greater than 0, also containing lanthanum oxide. In this technique the nitrates (and oxide, if applicable) in the appropriate amounts are oxidatively decomposed in air at about 400° C. for 2–3 hours in a Lindberg furnace followed by successive regrinding and refiring to 800° C. for a period of 3 to 70 hours until no unreacted nitrate can be detected in either the x-ray powder diffraction patterns or the infrared spectra of the oxygenated precursor compound product.

For the lanthanum-containing materials with a greater than zero, a smooth and essentially linear increase in lattice parameter with increasing lanthanum content is observed. Thus, as a is increased from zero to one, the lattice parameter of the fully oxidized precursor compounds increases smoothly from $a_o = 8.71(1)$Å (a=0, $Ba_2Bi_2O_6$) to $a_o = 8.77(1)$ Å (a=1, $Ba_2LaBiO_6$). Because the two end members, $Ba_2Bi_2O_6$ and $Ba_2LaBiO_6$, are known to have y=1 in the above formulae as discussed by G. Thornton and A. J. Jacobson, *Acta. Cryst.* B34, 351–354 (1978) and V. R. Scholder, et al., *Zeitschrift fur Anorganische und Allgemeine Chemie*, 319, 375–386 (1963), it follows that each of the oxidized precursor compounds with values of a intermediate between zero and one have y=1, and their compositions may be written as $Ba_2La_aBi_{2-a}O_6$.

Once the precursor compound is obtained it is heated in a suitable reactor, preferably a Linberg tube furnace, in the presence of an amount of oxygen effective for a particular temperature to obtain an oxygen-deficient compound. The amount of oxygen which is effective will depend mainly on the type of precursor compound employed, the temperature at which the precursor is being heated, and the length of time for which the precursor is heated. Typically the heating will take place under a flow of a mixture of oxygen gas and an inert gas such as helium or argon at a flow rate of about 100 to 500 cm³/minute. Higher or lower flow rates may be employed depending mainly on the amount of precursor sample and the size of the reactor tube.

The temperature at which the precursor compound is heated is likewise dependent on many factors such as the type or precursor compound and the amount of oxygen present. At minimum, the temperature should be about 600° C., but preferably the temperature is higher, and more preferably is 600° to 1000° C. The time for heating will similarly depend on several factors such as the precursor, temperature and oxygen partial pressure. When the class of compounds is $Ba_2M_aBi_{2-a}O_{5+y}$ where M is trivalent, the interrelationships among the amount of oxygen, the temperature and the time employed can be expressed as follows, as demonstrated by the preferred class of compounds where M is lathanum: When the temperature is decreased, a lower oxygen pressure is required to obtain the product. As the value of a in the compound is increased, the temperature must be increased and/or the oxygen partial pressure must be decreased and the time for heating must be increased to obtain the reduced product. Even when these parameters are adjusted, however, if a in the formulae is increased beyond about 0.7 the product obtained on cooling will generally not be a single-phase material but rather will comprise two phases which may be a mixture of the fully oxidized material (y=1) and the fully reduced material (y=0). If the precursor compound is such that a is 0.5, when the compound is heated at about 600° to 1000° C. the oxygen partial pressure will be between about 0.001 and 0.000002 atm, depending on the temperature. The preferred temperature range of heating for a=0.5 is 800° to 1000° C. and most preferred is 950° to 1000° C. When a temperature of 1000° C. is employed for a=0.5 the oxygen partial pressure must be about 0.001 atm to obtain the product, whereas if the temperature is 950° C., the oxygen partial pressure is about 0.0001 atm and the time is at least 8 hours, preferably 10 to 12 hours. When a is increased to about 0.65 or greater, the preferred temperature is 900° to 1000° C. and the preferred oxygen partial pressure is from 0.001 to 0.000002 atm, and the reaction must be carried out for a longer period of time.

The composition range for the class of bismuth-containing compounds of the formula $Ba_2Bi_2O_{5+y}$ (where a in the general formula is 0) and the conditions for the synthesis of these compounds are summarized in the phase diagram depicted in FIG. 1. In this figure the temperature of heating is plotted against the y value in $Ba_2Bi_2O_{5+y}$ for nine fixed oxygen partial pressures in the range from 0.0001 to 1.00 atm. Each of the nine families of points, designated a through i, represents measurements at a fixed oxygen partial pressure. Thus, for plot a, represented by upright triangles (pointing upward), the oxygen partial pressure was 1.0 atm; for plot b, represented by squares, the oxygen partial pressure was 0.35 atm; for plot c, represented by plus signs, the oxygen partial pressure was 0.10 atm; for plot d, represented by triangles pointing to the right, the oxygen partial pressure was 0.03 atm; for plot e, represented by cross signs, the oxygen partial pressure was 0.010 atm; for plot f, represented by squares, the oxygen partial pressure was 0.0032 atm; for plot g, represented by triangles pointing downward, the oxygen partial pressure was 0.0010 atm; for plot h, represented by circles, the oxygen partial pressure was 0.00032 atm; and for plot i, represented by triangles pointing to the left, the oxygen partial pressure was 0.00010 atm. The lines connecting the points in the plots are drawn to aid the eye. Phase boundaries are dashed in regions where there is some uncertainty.

This diagram (FIG. 1) shows that for a fixed oxygen partial pressure of 0.0032 atm, three single-phase regions (designated I to III), each with variable oxygen stoichiometry, are encountered as the temperature is raised from 725° to 850° C. In phase region I where y is from 1.0 to 0.94, there is a narrow range of variable stoichiometry. In the single-phase regions II and III the oxygen stoichiometry ranges are: y from 0.77 to 0.47 and y from 0.16 to 0.10, respectively.

Figure 2:
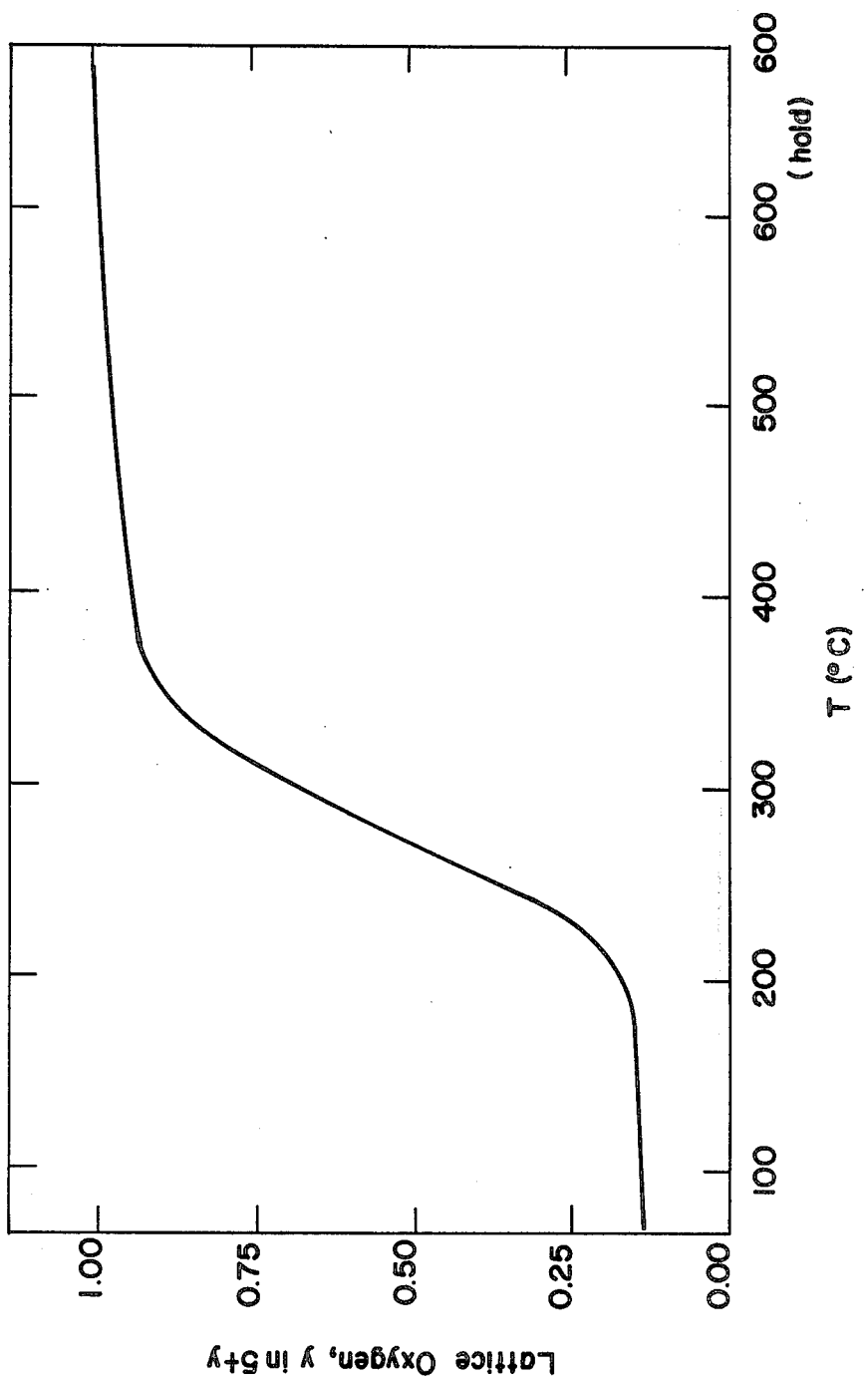
FIG. 2 represents a thermogravimetric record of $Ba_2La_{0.5}Bi_{1.5}O_{5+y}$, where y is about 0.14, reoxidized to $Ba_2La_{0.5}Bi_{1.5}O_6$ in the presence of oxygen to 600° C.

The oxygen-deficient compounds herein can be easily reoxidized in the presence of oxygen or air. This reoxidation is very rapid in air at temperatures as low as 300° C. The thermogravimetric record of $Ba_2La_{0.5}Bi_{1.5}O_{5+y}$ (where y is about 0.14) in oxygen given in FIG. 2 shows that oxidation begins at temperatures above 200° C. and is very rapid at 300° C.

Tables I-VIII list all of the observed x-ray diffraction data for several compounds from the preferred class of compounds $(Ba_2La_aBi_{2-a}O_{5+y})$ over the angular range $10° < 2\theta < 83°$. For the oxidized precursors, the x-ray diffraction patterns can be roughly indexed on the basis of a pseudocubic lattice parameter $a_o = 2a_c$. Here $a_c$ is the simple cubic distance characteristic of the Bi-O-Bi, Bi-O-La, or La-O-La arrays and varies from $a_c = 4.355(5)$ Å for $Ba_2Bi_2O_6$ with a=0 to $a_c = 4.385(5)$ Å for the lanthanum-containing material with a=1. With the exception of certain of the materials for which a=0, all of the oxygen-deficient materials can be indexed on the basis of similar distortions of the simple cubic distance $a_c$. The cell volume expands as oxygen is lost from the lattice so that for the lanthanum-containing oxygen-deficient materials with a>0 and y=0, $a_c \simeq 4.50$ Å and the pseudocubic lattice parameter $a_o = 2a_c$. For the material containing no lanthanum with a=0 and y=0.1, there is a pronounced tetragonal distortion so that $(a_t + b_t)/2 \simeq 2 a_c$ where $a_c \simeq 4.44$ Å and $a_t$ and $b_t$ are the new tetragonal lattice parameters.

The invention is further explicated by the examples which follow. In all examples, the parts and percentages are by weight and the temperatures are in degrees Celsius unless otherwise noted.

EXAMPLE 1

Preparation of $Ba_2Bi_2O_{5.0}$ $Ba_2Bi_2O_6$ was prepared by heating a mixture of 12.000 g $Ba(NO_3)_2$ and 22.269 g $Bi(NO_3)_3 \cdot 5H_2O$ in air at 400° C. for 2 hours followed by regrinding and refiring at 800° C. for 1 hr., and finally regrinding and refiring at 800° C. for 1 day. About 2 g of this material was heated to 800° C. in a Lindberg tube furnace in an oxygen-argon mixture containing 100 ppm oxygen (0.0001 atm oxygen) flowing at 300 cm³/min. The furnace was maintained at 800° C. for 2.5 hours after which the heating was discontinued and the sample was cooled in the same gas mixture. The sample was magenta in color when removed from the furnace at ambient temperature. It was necessary to store the sample in a moisture-free, inert gas atmosphere to maintain its integrity. An x-ray powder diffraction pattern of this single-phase material was recorded with a diffractometer using $CuK_\alpha$ radiation and the data is recorded in Table I. The pseudo-cubic lattice parameter of this perovskite-related structure is $a_o = 8.89(2)$Å. Thermogravimetric oxidation in pure oxygen to 600° C. of the sample revealed its oxide stoichiometry as $Ba_2Bi_2O_{5.0 \pm 0.02}$.

TABLE I

X-Ray Powder Diffraction Data For $Ba_2Bi_2O_{5.0}$

| peak no. | hkl[a] | $d_{observed}$ (Å) | Intensity[b] |
|---|---|---|---|
| 1 | | 5.41 | w− |
| 2 | 111 | 5.12 | w− |
| 3 | | 4.70 | w+ |
| 4 | | 4.37 | w+ |
| 5 | | 3.92 | w |
| 6 | | 3.54 | w |
| 7 | | 3.46 | w− |
| 8 | | 3.29 | w |
| 9 | 220 | 3.15 | s++ |
| 10 | | 3.11 | m+ |
| 11 | | 2.75 | w |
| 12 | | 2.61 | w− |
| 13 | | 2.50 | w− |
| 14 | 400 | 2.258 | w |
| 15 | | 2.226 | m+ |
| 16 | | 2.213 | m+ |
| 17 | | 2.190 | w+ |
| 18 | | 2.04 | w− |
| 19 | | 1.89 | w− |
| 20 | 422 | 1.818 | s |
| 21 | | 1.813 | s+ |
| 22 | 440 | 1.570 | m |
| 23 | | 1.554 | w |
| 24 | 620 | 1.407 | m− |
| 25 | | 1.400 | w+ |
| 26 | 444 | 1.283 | w |

TABLE I-continued

X-Ray Powder Diffraction Data For $Ba_2Bi_2O_{5.0}$

| peak no. | hkl[a] | $d_{observed}$ (Å) | Intensity[b] |
|---|---|---|---|
| 27 | 642 | 1.189 | m |

[a]Indexing was done on basis of a pseudocubic cell with $a_o$ = 8.89 Å.
[b]w = weak, m = medium, s = strong

EXAMPLE 2

Preparation of $Ba_2Bi_2O_{5.1}$ (tetragonal form)

$Ba_2Bi_2O_6$ was prepared as described in Example 1. About 2 g of this material was heated for three hours at 765° C. in a stream of argon and oxygen containing 1000 ppm oxygen (0.001 atm oxygen) and thereafter cooling the product in a stream of oxygen and argon containing 100 ppm oxygen (0.0001 atm). The resulting material, black in color, displayed an x-ray diffraction pattern showing a single-phase perovskite-like structure with a pronounced tetragonal distortion with $a_{tetr}$=8.784(5)Å and $c_{tetr}$=8.977(5)Å, as indicated in Table II. Thermogravimetric reoxidation of this material in oxygen to 600° C. showed an oxygen stoichiometry of $Ba_2Bi_2O_{5.10}\pm0.04$. The product of this reoxidation was $Ba_2Bi_2O_6$.

TABLE II x-Ray Powder Diffraction Pattern for $Ba_2Bi_2O_{5.1}$, tetragonal form

| Peak No. | hkl | d-value (observed) (Å) | d-value[a] (calc.) (Å) | Intensity[b] |
|---|---|---|---|---|
| 1a | 111 | 5.121 | 5.108 | w |
| 1b |  | 5.051 | 5.108 | w |
| 2 | 200 | 4.367 | 4.392 | m |
| 3 | 102 | 4.042 | 3.997 | w |
| 4a, | 20 3/2 | 3.500 | 3.541 | w |
| b | " | 3.536 | " | " |
| 5 | 21 3/2 | 3.279 | 3.284 | w— |
| 6 | 202 | 3.139 | 3.139 | s++ |
| 7 | 220 | 3.104 | 3.106 | s+ |
| 8 | 103 | 2.821 | 2.832 | w |
| 9 | 311 | 2.646 | 2.654 | w— |
| 10 | 004 | 2.244 | 2.244 | m |
| 11 | 400 | 2.197 | 2.196 | s |
| 12 | 303 | 2.090 | 2.093 | w— |
| 13 | 331 | 2.014 | 2.017 | w— |
| 14 | 420 | 1.960 | 1.964 | w |
| 15 | 412 | 1.930 | 1.925 | w— |
| 16 | 421 | 1.915 | 1.919 | w— |
| 17 | 224 | 1.819 | 1.819 | m+ |
| 18 | 422 | 1.799 | 1.799 | s+ |
| 19 | 511 | 1.692 | 1.692 | w— |
| 20 | 404 | 1.570 | 1.570 | m— |
| 21 | 440 | 1.552 | 1.553 | w+ |
| 22 | 433 | 1.515 | 1.515 | w— — |
| " | 503 | " | " | " |
| 23 | 601 | 1.444 | 1.444 | w— |
| " | 610 | " | " | " |
| 24 | 206 | 1.416 | 1.416 | w+ |
| 25 | 602, 405 | 1.390 | 1.390 | m— |
| " | 620 | " | " | " |
| 26 | 444 | 1.277 | 1.277 | w+ |
| 27 | 426 | 1.191 | 1.190 | w+ |
| 28a | 624 | 1.181 | 1.181 | w+ |
| 28b | 642 | 1.177 | 1.176 | w+ |

[a]calculated d-values were determined using $a_t = b_t$ = 8.784 Å, $c_t$ = 8.977 Å
[b]w = weak, m = medium, s = strong

EXAMPLE 3

Prepartion of $Ba_2Bi_2O_{5.1}$ (low symmetry form)

A 2 g sample of $Ba_2Bi_2O_{5.1}$ prepared as described in Example 2 was heated for three hours at 770° C. in a stream of argon and oxygen containing 1000 ppm oxygen (0.001 atm oxygen). Thereafter, the product was cooled in a stream of pure argon. The resulting material was bright yellow and showed an x-ray diffraction pattern which could not be indexed on the basis of a pseudocubic perovskite. The observed d-values for this "low symmetry" $Ba_2Bi_2O_{5.1}$ given in Table III show that this material contains no BaO or $Bi_2O_3$. Thermogravimetric reoxidaton of this material in oxygen showed an oxygen stoichiometry of $Ba_2Bi_2O_{5.06}\pm0.04$. The product of this reoxidation was $Ba_2Bi_2O_6$.

EXAMPLE 4

Preparation of $Ba_2Bi_2O_{5.6}$

A 2 g sample of $Ba_2Bi_2O_6$ prepared as described in Example 1 was heated for 58 hours at 715° C. in a stream of oxygen and argon containing 1000 ppm $O_2$ (0.001 atm $O_2$). The sample was cooled in the same atmosphere. The resulting material was dark brown and showed a perovskite-related x-ray diffraction pattern. The observed d-values and intensities are given in Table IV. The weak line at 3.15 Å is at the position of the strongest line of $Ba_2Bi_2O_{5.1}$ of Example 2 and may indicate the presence of a trace amount of this phase. Thermogravimetric reoxidaton in oxygen to 600° C. showed an oxygen stoichiometry of $Ba_2Bi_2O_{5.62}\pm0.04$. The product of this reoxidation was $Ba_2Bi_2O_6$.

TABLE III x-Ray Powder Diffraction Pattern for $Ba_2Bi_2O_{5.1}$, low symmetry form

| Peak No. | d-value (observed) (Å) | Intensity[a] | Peak No. | d-value (observed) (Å) | Intensity[a] |
|---|---|---|---|---|---|
| 1 | 7.25 | w | 21 | 2.304 | w— — |
| 2 | 5.249 | m— | 22 | 2.260 | w+ |
| 3 | 4.189 | w | 23 | 2.179 | w |
| 4 | 3.797 | w+ | 24 | 2.074 | s— (2 peaks) |
| 5 | 3.627 | w— | 25 | 2.049 | w— |
| 6 | 3.363 | w— — | 26 | 2.013 | w+ |
| 7 | 3.267 | s | 27 | 1.944 | w— |
| 8 | 3.202 | s++ | 28 | 1.908 | w— |
| 9 | 3.154 | w— | 29 | 1.896 | w+ |
| 10 | 3.057 | s+ | 30 | 1.826 | w+ |
| 11 | 2.990 | s | 31 | 1.810 | m— |
| 12 | 2.940 | w— — | 32 | 1.783 | m— |
| 13 | 2.842 | w+ | 33 | 1.768 | m— |
| 14 | 2.741 | w | 34 | 1.733 | w— |
| 15 | 2.707 | s | 35 | 1.704 | w— |
| 16 | 2.626 | w | 36 | 1.675 | w+ |
| 17 | 2.515 | w— | 37 | 1.666 | w |
| 18 | 2.384 | m | 38 | 1.638 | m— |
| 19 | 2.352 | w | 39 | 1.603 | w++ |
| 20 | 2.323 | w | 40 | 1.574 | w— |

[a]w = weak, m = medium, s = strong

TABLE IV x-Ray Powder Diffraction Data for $Ba_2Bi_2O_{5.6}$

| Peak No. | d-value (observed) (Å) | Intensity[a] | Peak No. | d-value (observed) (Å) | Intensity[a] |
|---|---|---|---|---|---|
| 1 | 7.47 | w— | 21 | 1.824 | w |
| 2 | 4.54 | w— | 22 | 1.795 | w |
| 3 | 4.34 | w+ | 23 | 1.778 | m |
| 4 | 4.21 | w | 24 | 1.772 | m+ |
| 5 | 3.58 | w— | 25 | 1.718 | w+ |
| 6 | 3.48 | w | 26 | 1.674 | w |
| 7 | 3.148 | w | 27 | 1.651 | w— |
| 8 | 3.063 | s++ | 28 | 1.546 | w+ |
| 9a | 2.940 | w | 29 | 1.536 | m— |
| 9b | 2.919 | w+ | 30 | 1.510 | w— |
| 10 | 2.658 | w | 31 | 1.453 | w |
| 11 | 2.629 | w | 32 | 1.427 | w |
| 12 | 2.398 | w | 33a | 1.382 | w+ |

TABLE IV-continued x-Ray Powder Diffraction Data for $Ba_2Bi_2O_{5.6}$

| Peak No. | d-value (observed) (Å) | Intensity[a] | Peak No. | d-value (observed) (Å) | Intensity[a] |
|---|---|---|---|---|---|
| 13 | 2.275 | w+ | 33b | 1.378 | m− |
| 14 | 2.216 | w− | 33c | 1.375 | m− |
| 15 | 2.176 | m | 33d | 1.372 | w+ |
| 16 | 2.108 | w+ | 34 | 1.317 | w− |
| 17 | 2.002 | w− | 35a | 1.260 | w |
| 18 | 1.941 | w+ | 35b | 1.258 | w |
| 19 | 1.914 | w− | 36 | 1.254 | w |
| 20 | 1.854 | w− | 37 | 1.207 | w− |
|  |  |  | 38 | 1.161 | m |

[a] w = weak, m = medium, s = strong

EXAMPLE 5

Preparation of $Ba_2La_{0.5}Bi_{1.5}Bi_{1.5}O_{5+y}$

A mixture of 12,000 g of $Ba(NO_3)_2$, 16.701 g of $Bi(NO_3)_3 \cdot 5H_2O$, and 1.870 g of $La_2O_3$ was heated in air to 400° C. for two hours. The sample was reground and fired at 800° C. in air for 1 hour followed by regrinding and refiring at 800° C. for 60 to 70 hours. The resulting material was determined by X-ray diffraction to be a pseudocubic perovskite material which could be roughly indexed using a lattice parameter $a_o = 8.74(1)$ Å. Comparison with the lattice parameters for $Ba_2Bi_2O_6$ and $Ba_2LaBiO_6$ shows that the correct oxygen composition for this material is specified by $Ba_2La_{0.5}Bi_{1.5}O_6$.

About 2 g of this composition was placed in an alumina boat in a Lindberg tube furnace under a gas stream of oxygen and argon containing 100 ppm oxygen (0.0001 atm partial pressure oxygen) flowing at 300 cm³/min. Separate thermogravimetric measurements showed that this material began to lose oxygen at 730° C. under these conditions and reached an approximate composition of $Ba_2La_{0.5}Bi_{1.5}O_{5.0}$ after being heated at 950° C. for 12 to 24 hours. The reduced material obtained after heating for 14 hours at 950° C. under the conditions described above in this example was bright yellow. Thermogravimetric reoxidation of this material in pure oxygen to 600° C. showed that the oxygen stoichiometry of the reduced material was $Ba_2La_{0.5}Bi_{1.5}O_{5.05}$. X-ray diffraction analysis indicated that the product of this reoxidation was the starting material previously identified as $Ba_2La_{0.5}Bi_{1.5}O_6$.

The X-ray diffraction pattern of the oxygen-deficient material, indicated in Table V, shows its structure to be a pseudocubic perovskite with $a_o$(reduced) = 8.94 (1) Å. Additional investigations revealed that the diffraction pattern for the intermediate compositions where x is between 0 and 1 showed a two-phase mixture of $Ba_2La_{0.5}Bi_{1.5}O_6$ and $Ba_2La_{0.5}Bi_{1.5}O_5$.

TABLE V

X-ray Powder Diffraction Data for $Ba_2La_{0.5}Bi_{1.5}O_{5.05}$

| Peak No. | hkl[a] | $d_{observed}$ (Å) | Intensity[b] |
|---|---|---|---|
| 1 | 111 | 5.13 | w− |
| 2 |  | 4.89 | w |
| 3 |  | 4.72 | w+ |
| 4 | 210 | 3.99 | w |
| 5 |  | 3.87 | w |
| 6 |  | 3.43 | w |
| 7 |  | 3.31 | w |
| 8 | 220 | 3.16 | s+ |
| 9 | 300, 221 | 2.98 | w− |
| 10 | 310 | 2.82 | w |
| 11 |  | 2.246 |  |
| 12 | 400 | 2.233 | s− |
| 13 |  | 2.139 | w |
| 14 | 330, 411 | 2.099 | w |
| 15 |  | 2.077 | w |
| 16 | 422 | 1.829 | s− |
| 17 |  | 1.825 |  |
| 18 | 440 | 1.584 | m |
| 19 |  | 1.576 |  |
| 20 | 620 | 1.421 | m |
| 21 |  | 1.414 |  |
| 22 | 444 | 1.291 | w+ |
| 23 | 642 | 1.197 | m |

[a] Indexing was done on the basis of a cubic cell with $a_o = 8.94(1)$ Å
[b] w = weak, m = medium, s = strong

EXAMPLE 6

Preparation of $Ba_2La_{0.8}Bi_{1.2}O_{5+y}$

A mixture of 3.0 g $Ba(NO_3)_2$, 3.340 g $Bi(NO_3)_3 \cdot 5H_2O$ and 0.748 g $La_2O_3$ was heated and ground as described in Example 5 above. The product was found to be a pseudocubic perovskite material with a lattice parameter consistent with the composition $Ba_2La_{0.8}Bi_{1.2}O_6$. Thermogravimetric measurements in 0.0001 atm partial pressure oxygen showed that this material began to lose oxygen at 850° C. These investigations further showed that, at a temperature of 950° C., y≃0.74 upon achieving equilibrium after about 20 hours. The material obtained was found to be rust colored.

EXAMPLE 7

Preparation of $Ba_2La_{0.75}Bi_{1.25}O_{5+y}$

A mixture of 6.0 g $Ba(NO_3)_2$, 6.959 g $Bi(NO_3)_3 \cdot 5H_2O$ and 1.403 g $La_2O_3$ was heated as described in Example 5 to give a pseudo-cubic perovskite with $a_o = 8.75(1)$ Å. Again comparison with the lattice parameters for $Ba_2Bi_2O_6$ ($a_o = 8.71$ Å) and $Ba_2BiLaO_6$ ($a_o = 8.77$ Å) shows that the correct oxygen composition for this fully oxidized material is specified by $Ba_2La_{0.75}Bi_{1.25}O_6$. This composition was heated as described in Example 5 to a temperature of 950° C. in 0.0001 atm oxygen partial pressure for 16 hours. The x-ray diffraction pattern for the material, represented in Table VI, indicated that the material was composed of approximately two-thirds of $Ba_2La_{0.75}Bi_{1.25}O_6$ (pseudocubic perovskite lines at higher angles corresponding to this product at $a_o = 8.75(1)$ Å) and one-third of $Ba_2La_{0.75}Bi_{1.25}O_5$ (pseudocubic perovskite lines at lower angles corresponding to this product at $a_o = 8.95(1)$ Å).

TABLE VI

X-Ray Powder Diffraction Data for $Ba_2La_{0.75}Bi_{1.25}O_{5+y}$

| hkl[a] | $d_{observed}$ (Å) y = 1 | $d_{observed}$ (Å) y = 0 | Intensity[b] |
|---|---|---|---|
| 111 | 5.07 |  | w |
|  |  | 4.89 | w− |
|  |  | 4.71 | w− |
| 200 | 4.39 |  | w+ |
| 220 | 3.097 | 3.161 | s++ |
| 311 | 2.64 |  | w |
| 400 | 2.192 | 2.235 | m+ |

TABLE VI-continued

X-Ray Powder Diffraction Data for
$Ba_2La_{0.75}Bi_{1.25}O_{5+y}$

| $hkl^a$ | $d_{observed}$ (Å) y = 1 | y = 0 | Intensity$^b$ |
|---|---|---|---|
| 420 | 1.961 | | w |
| 422 | 1.788 | 1.828 | s |
| 333, 511 | 1.687 | | w |
| 440 | 1.551 | 1.583 | m |
| 620 | 1.387 | 1.415 | m |
| 444 | 1.265 | 1.292 | w+ |
| 642 | 1.172 | 1.197 | m |

$^a$Indexing was done on a cubic cell with $a_o$ = 8.75(1) Å for y = 1 (oxidized) and $a_o$ = 8.95(1) Å for y = 0 (reduced) phases, respectively.
$^b$w = weak, m = medium, s = strong

EXAMPLE 8

Preparation of $Ba_2LaBiO_{5+y}$

A mixture of 13.068 g $Ba(NO_3)_2$, 12.125 g $Bi(NO_3)_3.5H_2O$ and 4.073 g $La_2O_3$ was heated as described in Example 5 to yield a pseudo-cubic perovskite with $a_o$=8.77(1) Å and with composition $Ba_2LaBiO_6$. This composition was found to be stable to reduction at a temperature of 950° C. and 0.0001 atm partial pressure oxygen. On reducing the oxygen pressure to 0.000002 atm (a purified argon stream), heating of the $Ba_2LaBiO_6$ for 2.5 days at 900° C. resulted in an orange-rust colored material whose stoichiometry was shown by thermogravimetric oxidation to be $Ba_2BiLaO_{5.84}$. The X-ray diffraction pattern of the material, indicated in Table VII, showed dominantly $Ba_2LaBiO_6$ plus an additional pseudocubic perovskite material which could be indexed using $a_o$=8.98(3) Å. The latter minor phase was assumed to be $Ba_2LaBiO_5$.

TABLE VII

X-Ray Powder Diffraction Data for $Ba_2LaBiO_{5+y}$

| $hkl^a$ | $d_{observed}$ (Å) y = 1 | y = 0 | Intensity$^b$ |
|---|---|---|---|
| 111 | 5.07 | | m− |
| 200 | 4.39 | | m− |
| 220 | 3.100 | 3.17 | s++ |
| 311 | 2.644 | | w |
| 400 | 2.194 | 2.25 | s |
| 420 | 1.961 | | w |
| 422 | 1.789 | 1.83 | s+ |
| 440 | 1.550 | 1.59 | m+ |
| 620 | 1.387 | | m+ |
| 444 | 1.265 | | w+ |
| 642 | 1.172 | | m+ |

$^a$Indexing was done using a cubic cell with $a_o$ = 8.77(1) Å for y = 1 (oxidized) and $a_o$ = 8.98(3) Å for y = 0 (reduced) phases, respectively.
$^b$w = weak, m = medium, s = strong

EXAMPLE 9

Preparation of $Ba_2La_{0.67}Bi_{1.33}O_5$

A mixture of 10.454 g of $Ba(NO_3)_2$, 2.183 g of $La_2O_3$ and 12.9 g of $Bi(NO_3)_3.5H_2O$ was heated as described in Example 5 to yield a pseudo-cubic perovskite with $a_o$=8.75(1) Å. Comparison with the lattice parameters for $Ba_2Bi_2O_6$ ($a_o$=8.71 Å) and $Ba_2LaBiO_6$ ($a_o$=8.77 Å) shows that the correct oxygen composition for this fully oxidized material is specified by $Ba_2La_{0.67}Bi_{1.33}O_6$. Thermogravimetric analysis of a 0.1 g sample of this composition showed that this material began to lose oxygen at a temperature of about 800° C. when exposed to an oxygen pressure of 0.001 atm and that upon increasing the temperature to 1000° C. and reducing the oxygen pressure to 0.000002 atm (purified argon stream), the material was reduced to a composition $Ba_2La_{0.67}Bi_{1.33}O_5$ after a period of 12 to 24 hours. The x-ray diffraction spectrum of the resulting material, which was yellow in color, was that of a single phase pseudo-cubic perovskite material with a lattice parameter $a_o$=8.96(1) Å as is indicated in Table VIII.

TABLE VIII

X-Ray Powder Diffraction Data For $Ba_2La_{0.67}Bi_{1.33}O_5$

| Peak No. | $hkl^a$ | $d_{observed}$ (Å) | Intensity$^b$ |
|---|---|---|---|
| 1 | | 4.72 | w |
| 2 | 220 | 3.16 | s+ |
| 3 | 400 | 2.238 | m+ |
| 4 | 422 | 1.829 | s− |
| 5 | 440 | 1.584 | m |
| 6 | 620 | 1.416 | m |
| 7 | 444 | 1.294 | w+ |
| 8 | 642 | 1.198 | m |

$^a$Indexing was done on the basis of a cubic cell with $a_o$ = 8.96(1) Å.
$^b$w = weak, m = medium, s = strong All of the oxygen-deficient, bismuth-containing materials of Examples 1–9, which represent the preferred class of compounds herein, were found to be extremely hygroscopic and showed significant hydration in a matter of minutes under ambient conditions. The x-ray patterns are for the anhydrous materials, although there are indications that some hydration occurred during the measurement. It appears that substitution of lanthanum for a portion of the bismuth in $Ba_2Bi_2O_6$ suppressed the intermediate phase (Region II) in the phase diagram of FIG. 1. Long-term thermogravimetric studies indicated that the $Ba_2La_aBi_{2-a}O_{5+y}$ materials constitute single phases under conditions of their synthesis at high temperature and low oxygen partial pressure. Phase separation occurred on cooling. Each of the lanthanum-containing compounds showed about a 7% increase in cell volume from the oxidized (y=1) to the reduced (y=0) phase comparable to the approximately 5% volume expansion when $BaBiO_3$ was reduced to $BaBiO_{2.55}$. The fact that these materials are readily reoxidized in air or oxygen at relatively low temperatures (see FIG. 2) and that $Ba_2La_{0.8}Bi_{1.25}O_{5+y}$ was observed as a reaction product upon reduction by propylene at 475°–500° C. indicates that the class of compounds herein described are useful in oxidative dehydrogenation reactions.

EXAMPLE 10

Preparation of $Ba_2ScBiO_{5+y}$

This example illustrates the preparation of a scandium-containing oxygen-deficient perovskite.

A mixture of 15.680 g of $Ba(NO_3)_2$, 2.069 g of $Sc_2O_3$ and 14.549 g of $Bi(NO_3)_3.5H_2O$ was heated in air to 400° C. for 1 hour, followed by regrinding and refiring at 400° C. for an additional hour followed by several regrindings and refirings at 800° C. in air for a total of 170 hours. Thermogravimetric analysis of a 0.1 g sample of the resulting oxidized material showed that this material began to lose oxygen at a temperature of 500° C. when exposed to an oxygen pressure of 0.0001 atm. Upon increasing the temperature to 925° C. and holding at that temperature for a period of 1 hour, the material was reduced to the extent that the value of y in the composition $Ba_2ScBiO_{5+y}$ was decreased from its initial value by 0.50±0.04. Following cooling, the resulting oxygen-deficient material was reoxidized by heating in oxygen to 600° C., with reoxidation being very rapid as the temperature was increased above 300° C.

EXAMPLE 11

Preparation of $Ba_2Sc_{0.5}Bi_{1.5}O_{5+y}$

This example illustrates the preparation of a scandium-containing oxygen-deficient perovskite for which the value of a in $Ba_2Sc_aBi_{2-a}O_{5+y}$ is intermediate between 0 and 1.

A mixture of 10.454 g of $Ba(NO_3)_2$, 0.690 g of $Sc_2O_3$, and 14.550 g of $Bi(NO_3)_3.5H_2O$ was heated as described in Example 10. Thermogravimetric analysis of a 0.1 g sample of the resulting fully oxidized material showed that this material began to lose oxygen at a temperature of 500° C. when exposed to an oxygen pressure of 0.0001 atm. Upon increasing the temperature to 925° C. and holding at 925° C. for a period of 1 hour, the material was reduced to the extent that the value of y in the composition $Ba_2Sc_{0.5}Bi_{1.5}O_{5+y}$ was decreased from its initial value by 0.88±0.04. Following cooling, the resulting oxygen-deficient material was reoxidized by heating in oxygen to 600° C., with reoxidation being very rapid as the temperature was increased above 300° C.

Examples 12-15 below, which illustrate the use of the reoxidizable compositions herein and/or their fully oxidized precursors as oxidizing agents, constitute the examples of U.S. patent application Ser. Nos. 485,706 and 485,707, respectively, filed of even date with this application, both now abandoned both having the applicants K. Poeppelmeier and J. Longo. Wherever the word "moles" is used in the tables, it will be understood to mean moles per mole bismuth.

EXAMPLE 12

Catalyst mixtures were prepared either by mixing two moles of barium oxide with one mole of the post-transition metal oxide and one mole of the trivalent metal oxide, or by mixing three moles of barium oxide with two moles of the post-transition metal oxide and one mole of the divalent metal oxide catalyst, as indicated in Table IX. The mixtures were ground, heated to 400° C. in air, and then cooled and ground in air, and reheated to 800° C. in air or oxygen for 6 hours. This last step effectively increases the amount of oxygen (y) available for reaction when contacted with a hydrocarbon to its maximum amount. Formation of catalyst was detected by X-ray diffraction analysis.

Each catalyst so prepared, in an amount of 3 grams, was supported on a glass frit in the isothermal zone of a 20 mm outer diameter glass reactor. The reactor was heated in a conventional resistance-heated furnace.

A feedstream consisting of about 5% isobutylene and 95% helium was introduced through each reactor at a rate of 30 cc per minute after heating the reactor and its contents to a temperature of 475° C. in helium. During the first two to three hours of reaction, samples of the reaction mixture were injected at 15 minute intervals using a gas sampling valve into a gas chromatograph and the identity and quantity of each product were determined. The molar amounts of 2,5-dimethyl-1,5-hexadiene dimer and aromatic products per mole bismuth were calculated from the integrations of the chromatographic peaks so as to determine the total yield of all hydrocarbon products for each catalyst and the relative yield of para-xylene for each catalyst.

The types and yields of products as well as the relative yields of aromatic product for each catalyst are indicated in Table IX. The molar yields of each product are all expressed in units of moles per mole bismuth and are all normalized to the molar yield of p-xylene using $Ba_2ScBiO_{5+y}$ as catalyst. (In the formulae, for catalysts containing $O_{7+y}$, y has a maximum value of 2, whereas for the catalysts containing $O_{5+y}$, y has a maximum value of 1.)

After sampling the reaction mixture for subsequent analysis (about 2-3 hours of reaction) each catalyst was regenerated by stopping the flow of feedstream and injecting oxygen gas into the reaction chamber for about 60 minutes. The feedstream was then reinitiated for subsequent conversion of isobutylene to products.

The results show that no broad generalization can be made as to which groups of the Periodic Table can be utilized effectively for production of para-xylene. It can be seen, however, that trivalent metal cations are preferred over divalent cations in the majority of catalysts for increasing the relative yield of aromatic product. For those materials which exhibit a good relative yield of para-xylene (e.g., greater than 70%), $Ba_2ScBiO_{5+y}$ is by far the best catalyst under the conditions employed herein in terms of total yield of product.

TABLE IX

| Group of Periodic Table | Metal Oxide Catalyst | Yield of para-Xylene[a] (A) | Yield of 2,5-Dimethyl-1,5-hexadiene Dimer[a] (B) | Yield of Other Products[a,b] (C) | Relative Yield[c] A/(A + B + C) | Total Yield[d] |
|---|---|---|---|---|---|---|
| IIA | $Ba_3MgBi_2O_{7+y}$ | 0.05 | 0.32 | trace | 13 | 0.37 |
|  | $Ba_3BaBi_2O_{7+y}$ | 0.01 | 0.13 | N.D. | 7 | 0.14 |
| IIIB | $Ba_2ScBiO_{5+y}$ | 1.00 | 0.01 | trace | 99 | 1.01 |
|  | $Ba_2YBiO_{5+y}$ | 0.55 | 0.06 | trace | 90 | 0.61 |
|  | $Ba_2LaBiO_{5+y}$ | 0.43 | 0.12 | trace | 78 | 0.55 |
| Lanthanide | $Ba_2PrBiO_{5+y}$ | 0.03 | 0.30 | N.D. | 9 | 0.33 |
|  | $Ba_2NdBiO_{5+y}$ | 0.54 | 0.12 | trace | 82 | 0.66 |
|  | $Ba_2DyBiO_{5+y}$ | 0.39 | 0.10 | trace | 80 | 0.49 |
| IIIA | $Ba_2AlBiO_{5+y}$ | 0.03 | 0.30 | N.D. | 9 | 0.33 |
|  | $Ba_2GaBiO_{5+y}$ | 0.32 | 0.22 | trace | 59 | 0.54 |
|  | $Ba_2InBiO_{5+y}$ | 0.69 | 0.06 | less than 0.05 | 92 | 0.75 |
|  | $Ba_2TlBiO_{5+y}$ | 0.65 | 0.40 | less than 0.05 | 62 | 1.05 |

TABLE IX-continued

| Group of Periodic Table | Metal Oxide Catalyst | Yield of para-Xylene[a] (A) | Yield of 2,5-Dimethyl-1,5-hexadiene Dimer[a] (B) | Yield of Other Products[a,b] (C) | Relative Yield[c] $\frac{A}{A + B + C}$ | Total Yield[d] |
|---|---|---|---|---|---|---|
| — | α-Bi$_2$O$_3$* | 0.23 | 0.34 | 0.09 | 35 | 0.66 |

*Comparative examples.
[a]This number is normalized to the moles of p-xylene produced using Ba$_2$ScBiO$_{5+y}$ as catalyst, which was arbitrarily assigned a value of 1.00.
[b]Other products detected (excluding combustion products, e.g. CO and CO$_2$) were benzene, toluene, 2,5-dimethyl-2,4-hexadiene, and two undetermined products (ethylbenzene and o, m-xylene were not detected).
[c]This number (mole fraction) represents the yield of para-xylene divided by the sum of the yields of para-xylene, 2,5-dimethyl-1,5-hexadiene dimer, and other products, multiplied by 100%.
[d]This number represents the sum of the yields of para-xylene, 2,5-dimethyl-1,5-hexadiene dimer, and other hydrocarbon products.
N.D. = not detectable

EXAMPLE 13

The procedure of Example 12 was repeated except that propylene gas was substituted for isobutylene gas. The catalysts employed and the results obtained are indicated in Table X. All nomenclature used in the table follows from Example 12.

For those catalysts which exhibit a good relative yield of benzene (e.g., greater than 50%), the results show that Ba$_2$ScBiO$_{5+y}$ is the best catalyst in terms of total yield of products.

rate of 30 cc per minute after heating the reactor and its contents to a temperature of 475° C. in helium. During the first two to three hours of reaction, samples of the reaction mixture were injected at 15 minute intervals using a gas sampling valve into a gas chromatograph and the identity and quantity of each product were determined. The molar amounts of 1,5-dimethyl-1,5-hexadiene dimer and other products per mole bismuth were calculated from the integrations of the chromatographic peaks so as to determine the total yield of all hydrocarbon products for each catalyst and the relative

TABLE X

| Group of Periodic Table | Metal Oxide Catalyst | Yield of Benzene[a] (A) | Yield of 1,5-Hexadiene Dimer[a] (B) | Yield of Other Products[a,b] (C) | Relative Yield[c] $\left(\frac{A}{A + B + C}\right)$ | Total Yield[d] |
|---|---|---|---|---|---|---|
| IIA | Ba$_3$MgBi$_2$O$_{7+y}$ | 0.21 | 0.12 | N.D. | 64 | 0.33 |
|  | Ba$_3$BaBi$_2$O$_{7+y}$ | 0.14 | 0.11 | N.D. | 56 | 0.25 |
| IIIB | Ba$_2$ScBiO$_{5+y}$ | 1.00 | 0.02 | trace | 98 | 1.02 |
|  | Ba$_2$YBiO$_{5+y}$ | 0.18 | 0.01 | trace | 95 | 0.19 |
|  | Ba$_2$LaBiO$_{5+y}$ | 0.18 | 0.02 | trace | 90 | 0.20 |
| Lanthanide | Ba$_2$PrBiO$_{5+y}$ | 0.42 | 0.18 | trace | 70 | 0.60 |
|  | Ba$_2$NdBiO$_{5+y}$ | 0.06 | 0.01 | N.D. | 86 | 0.07 |
|  | Ba$_2$DyBiO$_{5+y}$ | 0.10 | 0.02 | trace | 83 | 0.12 |
| IIIA | Ba$_2$AlBiO$_{5+y}$ | 0.03 | 0.01 | N.D. | 75 | 0.04 |
|  | Ba$_2$GaBiO$_{5+y}$ | 0.17 | 0.13 | trace | 57 | 0.30 |
|  | Ba$_2$InBiO$_{5+y}$ | 0.65 | 0.18 | N.D. | 78 | 0.83 |
|  | Ba$_2$TlBiO$_{5+y}$ | 0.60 | 0.60 | N.D. | 50 | 1.20 |

[a]This number is normalized to the moles of benzene produced using Ba$_2$ScBiO$_{5+y}$ as catalyst, which was arbitrarily assigned a value of 1.00.
[b]Other products detected (excluding combustion products, e.g. CO and CO$_2$) were 2,4-hexadiene isomers (mixture).
[c]This number (mole fraction) represents the yield of benzene divided by the sum of the yields of benzene, 1,5-hexadiene dimer, and other products, multiplied by 100%.
[d]This number represents the sum of the yields of benzene, 1,5-hexadiene dimer, and other hydrocarbon products.
N.D. = not detectable

EXAMPLE 14

Catalyst mixtures were prepared either by mixing two moles of barium oxide with one mole of the post-transition metal oxide and one mole of the trivalent metal oxide, or by mixing three moles of barium oxide with two moles of the post-transition metal oxide and one mole of the divalent metal oxide catalyst, as indicated in Table XI. The mixtures were ground, heated to 400° C. in air, and then cooled and ground in air, and reheated to 800° C. in air or oxygen for 6 hours. This last step effectively increases the amount of oxygen (y) available for reaction when contacted with a hydrocarbon to its maximum amount. Formation of catalyst was detected by X-ray diffraction analysis.

Each catalyst so prepared, in an amount of 3 grams, was supported on a glass frit in the isothermal zone of a 20 mm outer diameter glass reactor. The reactor was heated in a conventional resistance-heated furnace.

A feedstream consisting of about 5% isobutylene and 95% helium was introduced through each reactor at a yield of dimer for each catalyst.

The types and yields of products as well as the relative yields of aromatic product for each catalyst are indicated in Table XI. The molar yields of each product are all expressed in units of moles per mole bismuth and are all normalized to the molar yield of p-xylene using Ba$_2$ScBiO$_{5+y}$ as catalyst. (In the formulae, for catalysts containing O$_{7+y}$, y has a maximum value of 2, whereas for the catalysts containing O$_{5+y}$, y has a maximum value of 1).

After sampling the reaction mixture for subsequent analysis (about 2-3 hours of reaction) each catalyst was regenerated by stopping the flow of feedstream and injecting oxygen gas into the reaction chamber for about 60 minutes. The feedstream was then reinitiated for subsequent conversion of isobutylene to products.

For those catalysts which exhibit a good relative yield of 2,5-dimethyl-1,5-hexadiene dimer (e.g., at least 50%), the results show that Ba$_2$BiBiO$_{5+y}$ is clearly the best of all catalysts tested in terms of total yield of products.

TABLE XI

| Group of Periodic Table | Metal Oxide Catalyst | Yield of 2,5-Dimethyl-1,5-hexadiene Dimer[a] (A) | Yield of para-Xylene[a] (B) | Yield of Other Products[a,b] (C) | Relative Yield of 2,5-Dimethyl-1,5-hexadiene Dimer[c] $\left(\dfrac{A}{A+B+C}\right)$ | Total Yield[d] |
|---|---|---|---|---|---|---|
| IIA | $Ba_3MgBi_2O_{7+y}$ | 0.32 | 0.05 | trace | 87 | 0.37 |
|  | $Ba_3CaBi_2O_{7+y}$ | 0.34 | 0.17 | trace | 67 | 0.51 |
|  | $Ba_3SrBi_2O_{7+y}$ | 0.13 | 0.01 | N.D. | 93 | 0.14 |
|  | $Ba_3BaBi_2O_{7+y}$ | 0.13 | 0.01 | N.D. | 93 | 0.14 |
| IIIB | $Ba_2ScBiO_{5+y}$ | 0.01 | 1.00 | trace | 1 | 1.01 |
| Lanthanide | $Ba_2CeBiO_{5+y}$ | 0.30 | 0.04 | N.D. | 88 | 0.34 |
|  | $Ba_2PrBiO_{5+y}$ | 0.30 | 0.03 | N.D. | 91 | 0.33 |
|  | $Ba_2NdBiO_{5+y}$ | 0.12 | 0.54 | trace | 18 | 0.66 |
| VIII | $Ba_3NiBi_2O_{7+y}$ | 0.20 | 0.02 | trace | 91 | 0.22 |
|  | $Ba_2FeBiO_{5+y}$ | 0.21 | 0.15 | trace | 58 | 0.36 |
| IB | $Ba_3CuBi_2O_{7+y}$ | 0.11 | N.D. | N.D. | 100 | 0.11 |
| IIB | $Ba_3ZnBi_2O_{7+y}$ | 0.29 | 0.01 | N.D. | 97 | 0.30 |
|  | $Ba_3CdBi_2O_{7+y}$ | 0.35 | 0.04 | trace | 90 | 0.39 |
|  | $Ba_3HgBi_2O_{7+y}$ | 0.37 | 0.03 | N.D. | 93 | 0.40 |
| IIIA | $Ba_2AlBiO_{5+y}$ | 0.30 | 0.03 | N.D. | 91 | 0.33 |
|  | $Ba_2InBiO_{5+y}$ | 0.06 | 0.69 | less than 0.05 | 8 | 0.75 |
|  | $Ba_2TlBiO_{5+y}$ | 0.40 | 0.65 | less than 0.05 | 38 | 1.05 |
| VA | $Ba_2BiBiO_{5+y}$ | 0.85 | 0.01 | N.D. | 99 | 0.86 |
| — | $\alpha\text{-}Bi_2O_3$ | 0.34 | 0.23 | 0.09 | 52 | 0.66 |

*Comparative examples.
[a]This number is normalized to the moles of p-xylene obtained using $Ba_2ScBiO_{5+y}$ as catalyst, which was arbitrarily assigned a value of 1.00.
[b]Other products detected (excluding combustion products, e.g., CO and $CO_2$) were benzene, toluene, 2,5-dimethyl-2,4-hexadiene, and two undetermined products (ethylbenzene and o,m-xylene were not detected).
[c]This number (mole fraction) represents the yield of 2,5-dimethyl-1,5-hexadiene dimer divided by the sum of the yields of 2,5-dimethyl-1,5-hexadiene dimer, para-xylene, and other products, multiplied by 100%.
[d]This number represents the sum of the yields of 2,5-dimethyl-1,5-hexadiene dimer, para-xylene, and other hydrocarbon products.
N.D. = not detectable.

EXAMPLE 15

The procedure of Example 14 was repeated except that propylene gas was substituted for isobutylene gas.

The catalysts employed and the results obtained are indicated in Table XII. All nomenclature used in the table follows from Example 14.

The results show that $Ba_2BiBiO_{5+y}$ is a superior catalyst in terms of relative yield of dimer.

In summary, the present invention is seen to provide a class of oxygen-deficient, barium-containing compounds having a perovskite-type structure which are readily reoxidized and therefore can be used as continuously regenerable catalysts in oxidative dehydrogenation or in similar processes requiring solid oxidizing agents.

TABLE XII

| Group of Periodic Table | Metal Oxide Catalyst | Yield of 1,5-hexadiene Dimer[a] (A) | Yield of Benzene[a] (B) | Yield of Other Products[a,b] (C) | Relative Yield of 1,5-Hexadiene Dimer[c] $\left(\dfrac{A}{A+B+C}\right)$ | Total Yield[d] |
|---|---|---|---|---|---|---|
| IIA | $Ba_3MgBi_2O_{7+y}$ | 0.12 | 0.21 | N.D. | 36 | 0.33 |
|  | $Ba_3CaBi_2O_{7+y}$ | 0.06 | trace | N.D. | 100 | 0.06 |
|  | $Ba_3SrBi_2O_{7+y}$ | 0.11 | 0.05 | N.D. | 69 | 0.16 |
|  | $Ba_3BaBi_2O_{7+y}$ | 0.11 | 0.14 | N.D. | 44 | 0.25 |
| IIIB | $Ba_2ScBiO_{5+y}$ | 0.02 | 1.00 | trace | 2 | 1.02 |
| Lanthanide | $Ba_2CeBiO_{5+y}$ | 0.23 | 0.12 | N.D. | 66 | 0.35 |
|  | $Ba_2PrBiO_{5+y}$ | 0.18 | 0.42 | trace | 30 | 0.60 |
|  | $Ba_2NdBiO_{5+y}$ | 0.01 | 0.06 | N.D. | 14 | 0.07 |
| VIII | $Ba_3NiBi_2O_{7+y}$ | 0.15 | 0.03 | N.D. | 83 | 0.18 |
|  | $Ba_2FeBiO_{5+y}$ | 0.22 | 0.08 | N.D. | 73 | 0.30 |
| IB | $Ba_3CuBiO_{7+y}$ | 0.05 | trace | N.D. | 100 | 0.05 |
| IIB | $Ba_3ZnBi_2O_{7+y}$ | 0.09 | trace | N.D. | 100 | 0.09 |
|  | $Ba_3HgBi_2O_{7+y}$ | 0.12 | 0.05 | N.D. | 71 | 0.17 |
|  | $Ba_3CdBi_2O_{7+y}$ | 0.08 | trace | N.D. | 100 | 0.08 |
| IIIA | $Ba_2AlBiO_{5+y}$ | 0.01 | 0.03 | N.D. | 25 | 0.04 |
|  | $Ba_2InBiO_{5+y}$ | 0.18 | 0.65 | N.D. | 22 | 0.83 |
|  | $Ba_2TlBiO_{5+y}$ | 0.60 | 0.60 | N.D. | 50 | 1.20 |
| VA | $Ba_2BiBiO_{5+y}$ | 0.11 | trace | N.D. | 100 | 0.11 |

[a]This number is normalized to the moles of benzene obtained using $Ba_2ScBiOhd\ 5+y$ as catalyst, which was arbitrarily assigned a value of 1.00.
[b]The other products (excluding combustion products, e.g., CO and $CO_2$) detected were 2,4-hexadiene isomer (mixture).
[c]This number (mole fraction) represents the yield of total 1,5-hexadiene dimer divided by the sum of the yields of 1,5-hexadiene dimer, benzene, and other products, multiplied by 100%.
[d]This number represents the sum of the yields of total 1,5-hexadiene dimer, benzene, and other hydrocarbon products.
N.D. = not detectable.

What is claimed is:

1. An oxygen-deficient, barium-containing compound having a perovskite-type structure of the formula:

$$Ba_2M_aM'_{2-a}O_{5+y}$$

if M is a trivalent cation, or $$Ba_3M_aM'_{3-a}O_{[7.5-(a/2)+y]}$$

if M is a divalent cation, wherein M is selected from the group consisting of Mg, Ca, Sr, Ba, Sc, Y, La, the lanthanides of atomic number 58 or greater, Ni, Fe, Cu, Al, Ga, In, Zn, Cd, Hg, Bi, Tl and a mixture thereof, M' is selected from the group consisting of Sb or Bi, a is equal to or greater than 0 but less than or equal to 1, and if M is a trivalent cation, y is equal to or greater than 0 but less than 1, and if M is a divalent cation, y is equal to or greater than 0 but less than $(3+a)/2$.

2. An oxygen-deficient, bismuth-containing compound having a perovskite-type structure of the formula:

$$Ba_2M_aBi_{2-a}O_{5+y}$$

wherein M is La or Sc, a is equal to or greater than 0 but less than or equal to 1 and y is equal to or greater than 0 but less than 1.

3. A compound according to claim 1 of the formula:

$$Ba_2Bi_2O_{5+y}$$

wherein y is equal to or greater than 0 but less than 1.

4. A compound according to claim 3 wherein y is from 0 to 0.6.

5. A compound according to claim 3 wherein y is about 0 or about 0.6.

6. A compound according to claim 2 of the formula:

$$Ba_2La_aBi_{2-a}O_{5+y}$$

wherein a is greater than 0 but no greater than 1.

7. A compound according to claim 6 wherein y is less than or equal to 0.1.

8. A compound according to claim 6 wherein a is 0.5 and y is 0.

9. A process for preparing the oxygen-deficient, barium-containing compound of claim 1 which comprises heating a precursor compound of the formula:

$$Ba_2M_aM'_{2-a}O_{5+y}$$

if M is a trivalent cation, or $$Ba_3M_aM'_{3-a}O_{[7.5-(a/2)+y]}$$

if M is a divalent cation, wherein M, M', and a are defined in claim 1, y is about 1 but not greater than 1 if M is trivalent, and y is about $(3+a)/2$ but not greater than $(3+a)/2$ if M is divalent, in the presence of an effective amount of oxygen at a temperature of at least about 600° C., depending on the particular precursor compound and the amount of oxygen present, for a sufficient period of time to produce the oxygen-deficient compound.

10. A process according to claim 9 wherein M is Sc or La and M' is Bi.

11. A process according to claim 9 wherein the precursor compound is of the formula:

$$Ba_2M_aBi_{2-a}O_6$$

where M is La or Sc.

12. A process according to claim 11 wherein a is 0 and the precursor compound is prepared from a mixture of barium carbonate or nitrate with a salt or oxide of bismuth.

13. A process according to claim 11 wherein a is greater than 0 and the precursor compound is prepared from a mixture of barium carbonate or nitrate with a salt or oxide of bismuth and a salt or oxide of M.

14. A process according to claim 9 wherein the precursor compound is heated at from about 600° to 1000° C., depending on the particular precursor compound and the amount of oxygen present.

15. A process according to claim 11 wherein the precursor compound is heated at from about 800° to 1000° C., depending on the particular precursor compound and the amount of oxygen present.

16. A process according to claim 11 wherein the amount of oxygen present is sufficient to yield an oxygen partial pressure of between about 0.001 and 0.000002 atm.

17. A process according to claim 14 wherein the amount of oxygen present is sufficient to yield an oxygen partial pressure of between about 0.001 and 0.000002 atm.

18. A process for preparing an oxygen-deficient, bismuth-containing compound having a perovskite-type structure of the formula:

$$Ba_2La_{0.5}Bi_{1.5}O_{5+y}$$

wherein y is equal to or greater than 0 but less than 1, which process comprises (a) heating a mixture of Ba(NO$_3$)$_2$, Bi(NO$_3$)$_3$·5H$_2$O and La$_2$O$_3$ in air to 800° C. in relative proportions so as to produce a precursor compound of the formula:

$$Ba_2La_{0.5}Bi_{1.5}O_6;$$

and (b) heating the precursor compound at an oxygen partial pressure of between about 0.001 and 0.0001 atm and at a temperature of 950° to 1000° C., depending on the oxygen partial pressure, for a sufficient period of time to produce the oxygen-deficient compound.

19. A process according to claim 18 wherein y is 0.

20. A process according to claim 19 wherein the precursor compound is heated at 950° C. at an oxygen partial pressure of 0.0001 atm for at least 8 hours.

* * * * *